No. 729,343. PATENTED MAY 26, 1903.
O. HOLZ.
POWER FACTOR METER.
APPLICATION FILED JAN. 31, 1901.
NO MODEL. 2 SHEETS—SHEET 1.

Witnesses.
John Ellis Glenn.
Benjamin B. Hull.

Inventor.
Otto Holz,
by Albert G. Davis
Atty.

No. 729,343. PATENTED MAY 26, 1903.
O. HOLZ.
POWER FACTOR METER.
APPLICATION FILED JAN. 31, 1901.
NO MODEL. 2 SHEETS—SHEET 2.

Witnesses.
John Ellis Glenn
Benjamin B. Hull.

Inventor.
Otto Holz,
by Albert S. Davis
Atty.

No. 729,343.

Patented May 26, 1903.

UNITED STATES PATENT OFFICE.

OTTO HOLZ, OF SCHENECTADY, NEW YORK, ASSIGNOR TO GENERAL ELECTRIC COMPANY, A CORPORATION OF NEW YORK.

POWER FACTOR METER.

SPECIFICATION forming part of Letters Patent No. 729,343, dated May 26, 1903.

Application filed January 31, 1901. Serial No. 45,499. (No model.)

*To all whom it may concern:*

Be it known that I, OTTO HOLZ, a citizen of the United States, residing at Schenectady, county of Schenectady, State of New York, have invented certain new and useful Improvements in Power-Factor Meters, of which the following is a specification.

My present invention relates to a power-factor or phase-angle meter of particular value in connection with multiphase alternating-current systems. In such a system when the various phases are equally loaded the ratio of two wattmeter readings is a function of the power-factor or phase-angle between current and electromotive force. Upon this principle I have devised an instrument which by its deflection indicates the power factor of a multiphase system.

The invention may be embodied in a number of different forms, in all of which, however, there is a fixed and a movable member, the movable member being acted upon by two opposing torques representing the two wattmeter readings mentioned. This movable member, being unrestrained by springs or other devices for producing a restoring moment, is free to swing through any angle and assumes finally a position in which the two torques balance each other, one of the torques thus furnishing a sort of control to the other. The deflection of the movable member, being thus dependent upon the relative magnitudes of the two torques, is thus a function of the power factor of the system, and the instrument may therefore by a suitable calibration be made to read in angles or power factors. The various features of novelty which constitute the invention will be set forth more particularly in the claims appended hereto.

Some of the various embodiments which my invention may assume are shown in the accompanying drawings, in which—

Figure 5:
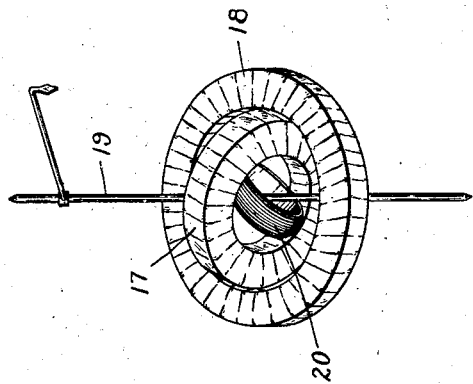
Figure 3:
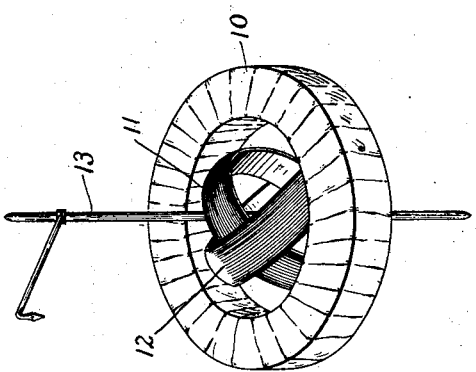
Figure 4:
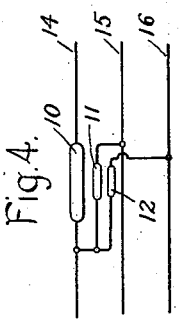
Figure 1:
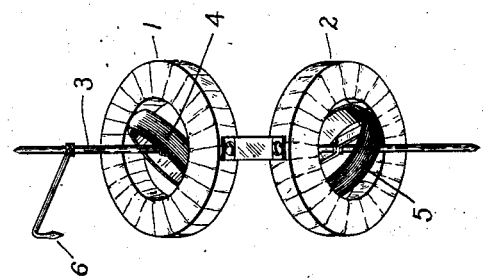
Figure 2:
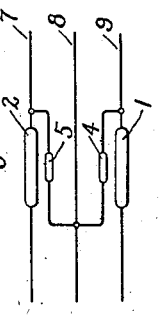
Figure 7:
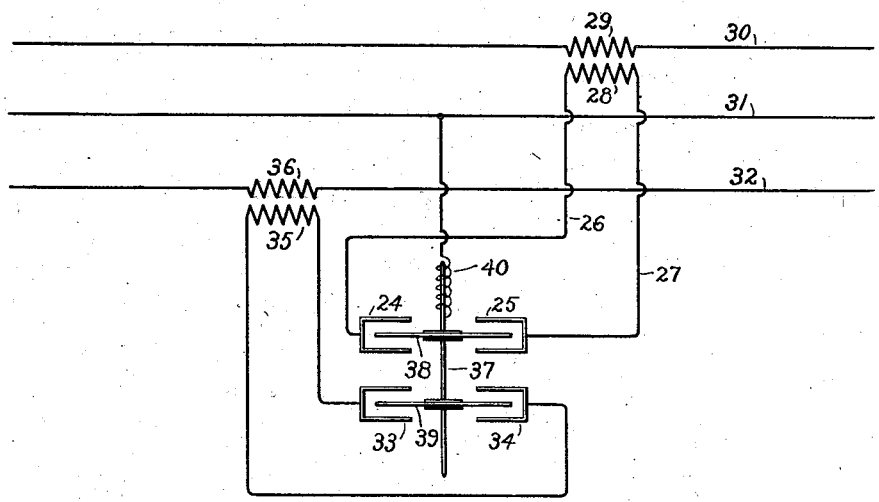
Figure 8:
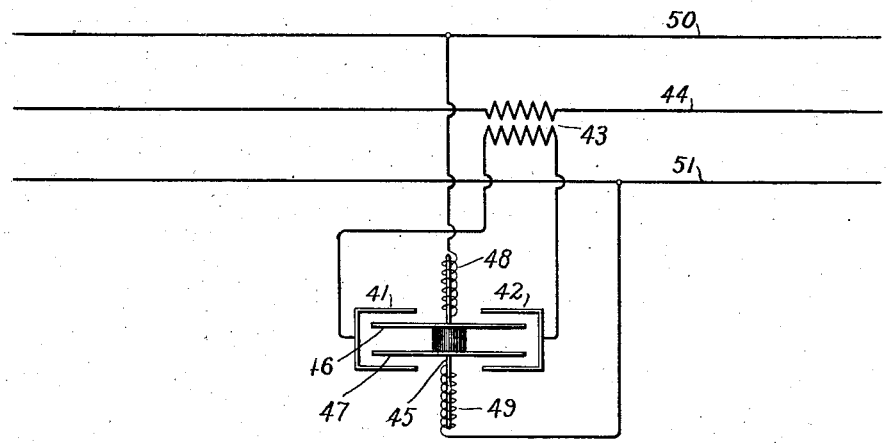
Figure 9:
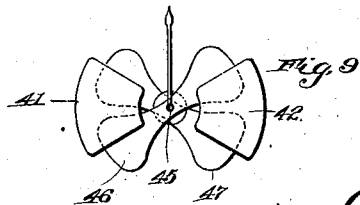

Figure 1 represents one form of my invention; Fig. 2, a diagram of connections for the same; Fig. 3, another form of invention, the circuits of which are represented in Fig. 4, while Fig. 5 represents still another form of the invention, and Fig. 6 the circuits thereof. Figs. 7 and 8 show forms of the instrument operating by electrostatic action, and Fig. 9 is a plan view of Fig. 8.

In Fig. 1 the power-factor meter is represented, for clearness, chiefly in diagram and will be seen to consist of a fixed member, comprising the current-coils 1 and 2, and a movable member having a shaft 3, carrying the potential-coils 4 5, which coöperate, respectively, with the current-coils 1 and 2. Each current-coil and its corresponding potential-coil will thus be seen to constitute a wattmeter, the connections being so made that one potential-coil tends to turn in a direction opposite from the other. If with the movable member in a position corresponding to the zero-point of the scale, (not shown,) over which the pointer 6 moves the opposing torques acting upon the movable member exactly balance each other, then the power factor of the system is unity. If the power factor changes, one of these torques no longer balances the other, and the movable member moves away from the zero position, the smaller torque gradually increasing and the larger torque decreasing until a point is reached where they reach a balance. The angle of deflection, though not necessarily proportional to the power factor, furnishes a measure thereof.

The respective coils of the power-factor meter may be connected up, as shown in Fig. 2, in which the mains 7, 8, and 9 correspond to the mains of the three-phase system. One of the current-coils—as, for example, the coil 2—is connected in series with the main 7 and the other coil 1 in series with the main 9. The potential-coil 5, coöperating with the current-coil 2, is connected between the mains 7 and 8, while in a similar manner the potential-coil 4, coöperating with the current-coil 1, is connected between the mains 8 and 9.

Since in a balanced multiphase circuit the power factor is dependent on the ratio between the watts of two circuits, the current-coils of such an instrument as shown in Fig. 1 may, since the currents in the respective mains are equal, be placed in series with each other without altering the result. In view of this fact I may dispense with one of the current-coils and cause the remaining coil to act upon both of the potential-coils. Such an instrument is shown in Fig. 3, in which a single current-coil is indicated at 10, and two potential-coils, movable relatively thereto, at 11 and 12. These potential-coils are carried by a suitably-pivoted shaft 13 and have their planes inclined both to the shaft and to each other. The plane of the current-coil 10 is likewise inclined to the shaft 13. The inclination of the current-coil and the respective potential-coils is made for the purpose of getting a greater range of deflection, and therefore a longer scale.

The power-factor meter thus described embodies the same principle of operation as that set forth in connection with the power-factor meter shown in Fig. 1. The movable member of the instrument shown in Fig. 3, being unrestrained and perfectly free to move about its axis, takes up a position such that the torque exerted by current in the coil 10 upon one of the potential-coils is balanced by the torque exerted by this current upon the other potential-coil. This position corresponds to a deflection which serves to indicate the power factor of the system to which the instrument may be applied.

The connections of the instrument are shown in Fig. 4, in which three-phase mains are indicated at 14, 15, and 16. The current-coil 10 is shown in series with one of the mains—as, for example, the main 14. The respective potential-coils 11 and 12 are connected across any two different pairs of mains—as, for example, the pairs 14 15 and 14 16, as shown.

The instrument shown in Fig. 5 may be considered in some respects as a reversal of that shown in Fig. 3, and consists, as will be seen, of two current-coils and one potential-coil instead of, as in Fig. 3, two potential-coils and one current-coil. The current-coils, preferably fixed in position, are represented at 17 and 18. The movable member of the instrument consists of a suitably-pivoted shaft 19, carrying the single potential-coil 20. This potential-coil is fixed so that its plane is inclined to the shaft 19. The current-coils 17 and 18 are adjusted so that their angular position with respect to the shaft 19 is such as to give a convenient spacing to the scale of the instrument. This spacing, it may be mentioned, may be varied by varying the positions of any one of the coils with respect to the other. Thus, for example, since the readings at or around unity power factor are generally more important than those where the power factor is low, the coils may be adjusted so as to give open-scale readings at and around the unity power-factor point.

Figure 6:
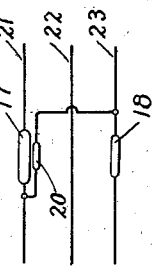

The current-coils 17 and 18 are connected, respectively, in series with different mains of the multiphase system in connection with which the instrument is to be used, these connections being indicated diagrammatically in Fig. 6. In this figure three-phase mains 21, 22, and 23 are chosen by way of example. The current-coils 17 and 18 are connected, respectively, in series with mains 21 and 23.

The single potential-coil 20 may then be connected across the same mains, as shown.

Figs. 7 and 8 shows different forms of phase-indicating or power-factor meters similar in principle to those already described but differing therefrom in that they operate by electrostatic instead of dynamic action. In Fig. 7 the U-shaped lines 24 and 25 represent sectional views of fixed quadrants of an electrostatic instrument, these quadrants being connected through conductors 26 and 27 to the secondary 28, the primary 29 of which is in series with one of the mains 30 of a three-phase system the other conductors of which are indicated at 31 and 32. These quadrants are therefore maintained at a difference of potential varying with the current in the main 30. Another set of quadrants 33 34 are similarly connected to a transformer-secondary 35, the primary 36 of which is in series with another one of the three-phase mains—as, for example, the main 32. A shaft 37 carries two armatures 38 and 39, which coöperate, respectively, with the upper and lower set of quadrants. These armatures are electrically connected together, and through a fine spring 40 or other suitable means are electrically joined to the three-phase main 31. With this arrangement the moving member, consisting of the shaft 37 and the armatures connected thereto, is acted upon by two torques which in the zero position of the movable member are equal when the power factor of the multiphase system is unity. When the power factor varies, however, the movable member shifts from its zero position and assumes a new position, at which the torques again balance. The angular displacement represents the change in power factor, as will readily be understood, the operation being substantially the same in principle as that already set forth in connection with the description of the instrument shown in Figs. 1 to 5, inclusive.

Figs. 8 and 9 show a different arrangement of electrostatic instrument corresponding to that shown in Fig. 3. In this case two fixed quadrants 41 and 42 are by means of the transformer 43 or some other suitable device maintained at a potential difference varying with the load in one of the mains 44 of the multiphase system in connection with which the instrument is used. A shaft 45 carries two armatures 46 47, insulated from each other and suitably connected, as through light coiled wires 48 49, to the respective multiphase mains 50 51. The action of this form of instrument is substantially the same in principle as that of the instrument shown in Fig. 3, and so needs no further description.

Although I have illustrated my invention as used in connection with a multiphase system of the three-phase type, it will of course be evident that the same is equally applicable to a multiphase system with any other number of phases.

What I claim as new, and desire to secure by Letters Patent of the United States, is—

1. In a phase-indicating or power-factor meter for multiphase circuits, the combination of a fixed and a movable member, said members being free to move relatively to each other and to assume without restraint any angular relation with respect to each other, and connections between said members and the mains of a multiphase circuit such as to produce opposing torques acting on the movable member, said torques representing respectively the watts of two non-identical combinations of current and potential of said multiphase circuit.

2. The combination of multiphase mains, a power-factor meter consisting of relatively movable members, one of which is free to adjust its position with respect to another, means for supplying one member with current of a given phase, and means for supplying another member with relatively phase-displaced currents from said mains.

3. A power-factor meter for multiphase circuits, consisting of two relatively movable members one of which is provided with a plurality of potential-coils connected across different phases respectively of a multiphase circuit and is free to adjust its position with respect to the other member.

4. A power-factor meter for multiphase circuits, consisting of two relatively movable members one of which is provided with a plurality of potential-coils connected across different phases respectively of a multiphase circuit and is free to adjust its position with respect to the other member which is provided with a current coil or coils in series with a main or mains of said multiphase circuit.

5. A power-factor meter comprising two relatively movable members one of which is formed of a single current-coil, and the other of two potential-coils fixed with respect to each other and mounted to move about an axis inclined to the planes of said coils by angles each less than ninety degrees.

6. A power-factor meter comprising two relatively movable members one of which is formed of a single current-coil, and the other of two potential-coils fixed with respect to each other and mounted to move about an axis inclined to the planes of said coils.

7. A power-factor meter having a fixed and a movable member, the fixed member consisting of a current-coil inclined to the axis of the movable member, and the movable member including a plurality of potential-coils each inclined to said axis.

8. A power-factor meter having a fixed member consisting of a current-coil, a movable member free to adjust its position with respect to the fixed member and provided with two potential-coils, the coils both of the fixed and movable members being inclined to the axis of the movable member.

9. The combination of a multiphase alternating-current system, a power-factor meter therefor having relatively movable members, and means for supplying said meter with currents of the same phase relations as those existing on said system.

In witness whereof I have hereunto set my hand this 30th day of January, 1901.

OTTO HOLZ.

Witnesses:
  BENJAMIN B. HULL,
  MARGARET E. WOOLLEY.